United States Patent
Kuo

(10) Patent No.: US 8,018,209 B2
(45) Date of Patent: Sep. 13, 2011

(54) SWITCHING REGULATOR FOR FIXING FREQUENCY

(75) Inventor: Yueh-Lung Kuo, Taipei County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 183 days.

(21) Appl. No.: 12/566,643

(22) Filed: Sep. 24, 2009

(65) Prior Publication Data

US 2011/0068759 A1    Mar. 24, 2011

(51) Int. Cl.
*G05F 1/613* (2006.01)
(52) U.S. Cl. ........................................ 323/224; 323/284
(58) Field of Classification Search .................. 323/224, 323/283, 284
See application file for complete search history.

(56) References Cited

U.S. PATENT DOCUMENTS 6,246,220 B1 *  6/2001  Isham et al. .................. 323/224

* cited by examiner

*Primary Examiner* — Shawn Riley
(74) *Attorney, Agent, or Firm* — Winston Hsu; Scott Margo

(57) ABSTRACT

A switching regulator for fixing a frequency which includes a power stage circuit, for receiving an input voltage and outputting an output voltage according to an control signal; a reference voltage generator for generating a reference voltage; a comparator for outputting a comparing result according to the output voltage and the reference voltage; a constant-time trigger circuit for outputting the control signal according to the comparing result and a compensating signal; an a frequency compensator for outputting the compensating signal according to the output voltage and a phase signal; wherein the phase signal is corresponding to the magnitude of the voltage across the lower gate switch of the power stage circuit.

35 Claims, 4 Drawing Sheets

SWITCHING REGULATOR FOR FIXING FREQUENCY

BACKGROUND OF THE INVENTION

1. Field of the Invention

The present invention is related to a switching regulator, and more particularly, to a switching regulator for fixing an operating frequency by controlling a constant-time trigger, according to an output voltage and a phase signal.

2. Description of the Prior Art

Power supply devices play an essential role in modern information technology. Among all the power supply devices, a DC-DC switching regulator has been very popular and is mainly used to provide regulated DC power sources to electronic components. Please refer to FIG. 1, which illustrates a schematic diagram of a DC-DC switching regulator 10 of the prior art. The DC-DC switching regulator 10 is used to provide power for a load Load1, and includes an upper gate switch 100, a lower gate switch 102, a constant time trigger circuit 104, a comparator 106, an inductor L1, a capacitor C1, a reference voltage Vref1 and an inverter INV1. The constant time trigger circuit 104 can output a signal pulse with constant time width to control operations of the upper gate switch 100 and the lower gate switch 102. Every time when the output voltage Vout1 reaches a level smaller than the reference voltage Vref1, the comparator 106 outputs a signal to the constant time trigger circuit 104, such that the constant time trigger circuit 104 can output the signal pulse, to turn on the upper gate switch 100 and turn off the lower gate switch 102. Then, the input voltage source Vin1 starts delivering electric energy to the inductor L1 and then to the load Load1 via the upper gate switch 100. Since the signal pulse outputted from the constant time trigger circuit 104 is with constant time width, the upper gate switch 100 can be turned on for a constant period of time when the output voltage Vout1 is smaller than the reference voltage Vref1. If the output voltage Vout1 becomes higher than the reference voltage Vref1 after the constant period of time, the upper gate switch 100 will be turned off for a time interval of indefinite length. When the upper gate switch 100 is turned off, the output voltage of the DC-DC switching regulator 10 starts falling, and only when the output voltage Vout1 is less than the reference voltage Vref1, the upper gate switch 100 will be turned on again. In other words, the DC-DC switching regulator 10 uses a PWM (pulse width modulation) type of control to regulate the power delivery to the load Load1 by turning on and off the upper gate switch 100.

Meanwhile, since the operating period of the PWM signal is the summation of the turn-on time and the turn-off time of the upper gate switch 100, when the load Load1 changes, the duty cycle of the PWM signal will be changed accordingly, but since the turn on time of the constant time trigger circuit 104 has been fixed, and only the turn off time can be changed, it implies the operating period (as well as the operating frequency) of the PWM signal will also be changed when the output load changes. As can be seen in the DC-DC switching regulator 10, there are some components (e.g. inductor L and capacitor C for energy efficiency enhancement and ripple reduction) whose operating characteristics are highly dependent on the operating frequency of the DC-DC switching regulator 10. If the operating frequency roams in a wide range, it becomes impossible for the designer to optimize the designs of those frequency-sensitive components. In this case, some negative results might be present; for example, in the DC-DC switching regulator 10, the ripples of the output voltage Vout1 will become too large for proper operation in some applications.

Please refer to FIG. 2, which illustrates a schematic diagram of a DC-DC switching regulator 20 of the prior art which can fix its operating frequency. The DC-DC switching regulator 20 differs from the DC-DC switching regulator 10 by adding some components for fixing the operating frequency. The DC-DC switching regulator 20 includes an upper gate switch 200, a lower gate switch 202, a constant time trigger circuit 204, a comparator 206, an inductor L2, a capacitor C2, a reference voltage Vref2a and an inverter INV2. Besides, a frequency fixing circuit 250 is added to the DC-DC switching regulator 20. The frequency fixing circuit 250 further includes an error amplifier 252, a compensator 254, a frequency-to-voltage converter 256 and a voltage reference Vref2b. Noticeably, the constant time trigger circuit 204 also differs from the constant time trigger circuit 104 by adding an extra control input end 204a. Since the control input end 204a can be utilized to adjust the turn-on time of the constant time trigger circuit 204 for the purpose of frequency fixing, the turn-on time of the constant time trigger circuit 204 is not always fixed. When the frequency tends to change, the constant time trigger circuit 204 can adjust the length of its turn-on time according to the control signals received from the control input end 204a. Furthermore, the constant time trigger circuit 204 can combine with the frequency to voltage converter 256, the error amplifier 252 and the compensator 254 to form a closed loop, to force the output voltage V256 of the frequency to voltage converter 256 to track the reference voltage Vref2b, such that the frequency (or period) of the PWM signal outputted by the constant time trigger circuit 204 can be fixed.

However, although the operating frequency of the DC-DC switching regulator 20 can be fixed and let the designer optimize the designs of the frequency sensitive components to reduce the output ripples, the architecture and the related circuit of the DC-DC switching regulator 20 still deserve further investigation—to realize the frequency fixing functions, it requires complex circuitry to implement the frequency to voltage converter 256, the error amplifier 252 and the compensator 254. In other words, it will take relatively large chip area, and the production cost is still higher than expected.

SUMMARY OF THE INVENTION

It is therefore a primary objective of the claimed invention to provide a switching regulator which can fix its operating frequency by controlling a constant-time trigger, according to an output voltage and a phase signal.

The present invention discloses a switching regulator for fixing a frequency, which comprises a power stage circuit, for receiving an input voltage and outputting an output voltage according to an control signal, comprising an upper gate switch, a lower gate switch coupled to the upper gate switch, and an output inductor coupled to the upper gate switch and the lower gate switch; a reference voltage generator for generating a reference voltage; a comparator for outputting a comparing result according to the output voltage and the reference voltage; a constant-time trigger circuit for outputting the control signal according to the comparing result and a compensating signal; and a frequency compensator for outputting the compensating signal according to the output voltage and a phase signal, wherein the phase signal is corresponding to the magnitude of the voltage across the lower gate switch of the power stage circuit.

The present invention further discloses a frequency compensator for a switching regulator, which comprises a voltage-to-current converter for outputting a converted current according to the phase signal; and a current-to-voltage converter for outputting a compensating signal according to the converted current and the output voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
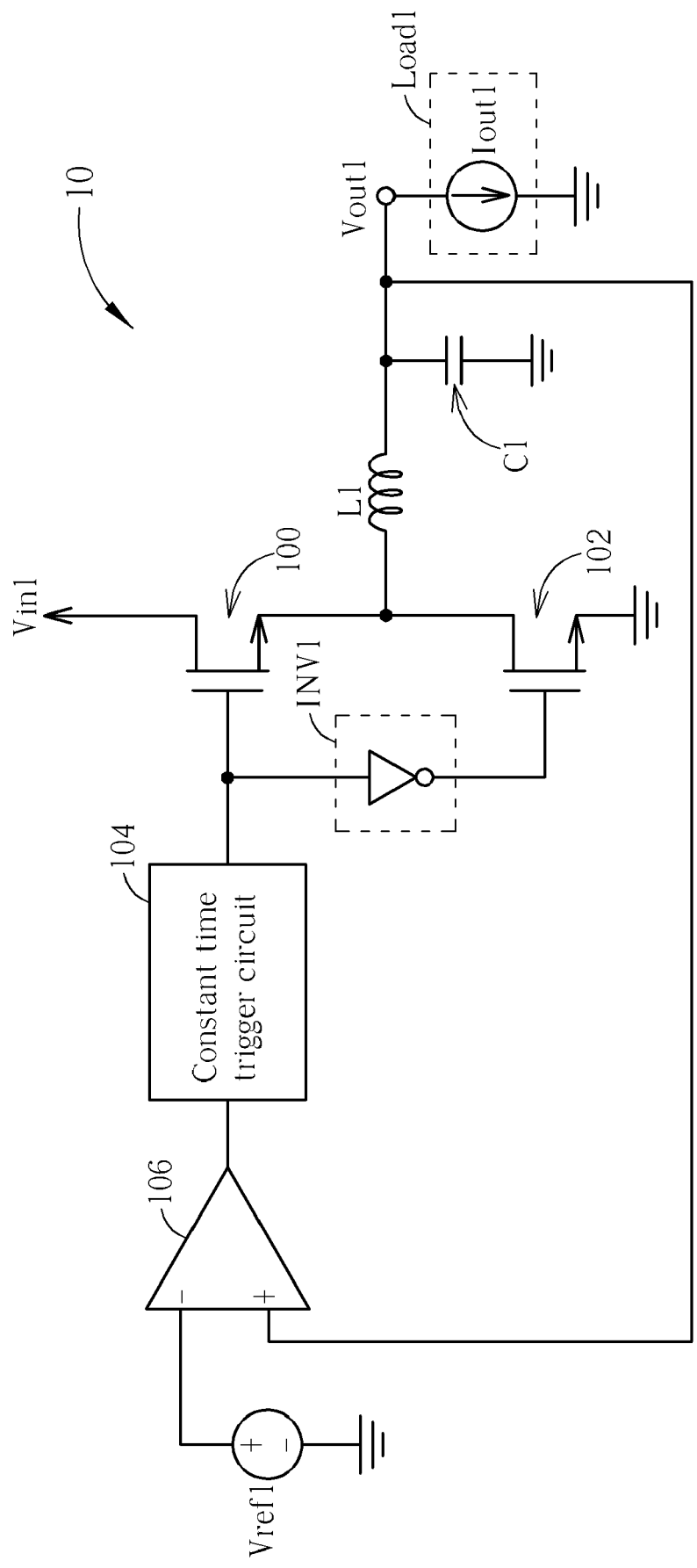
FIG. 1 illustrates a schematic diagram of a DC-DC switching regulator of the prior art.
Figure 2:
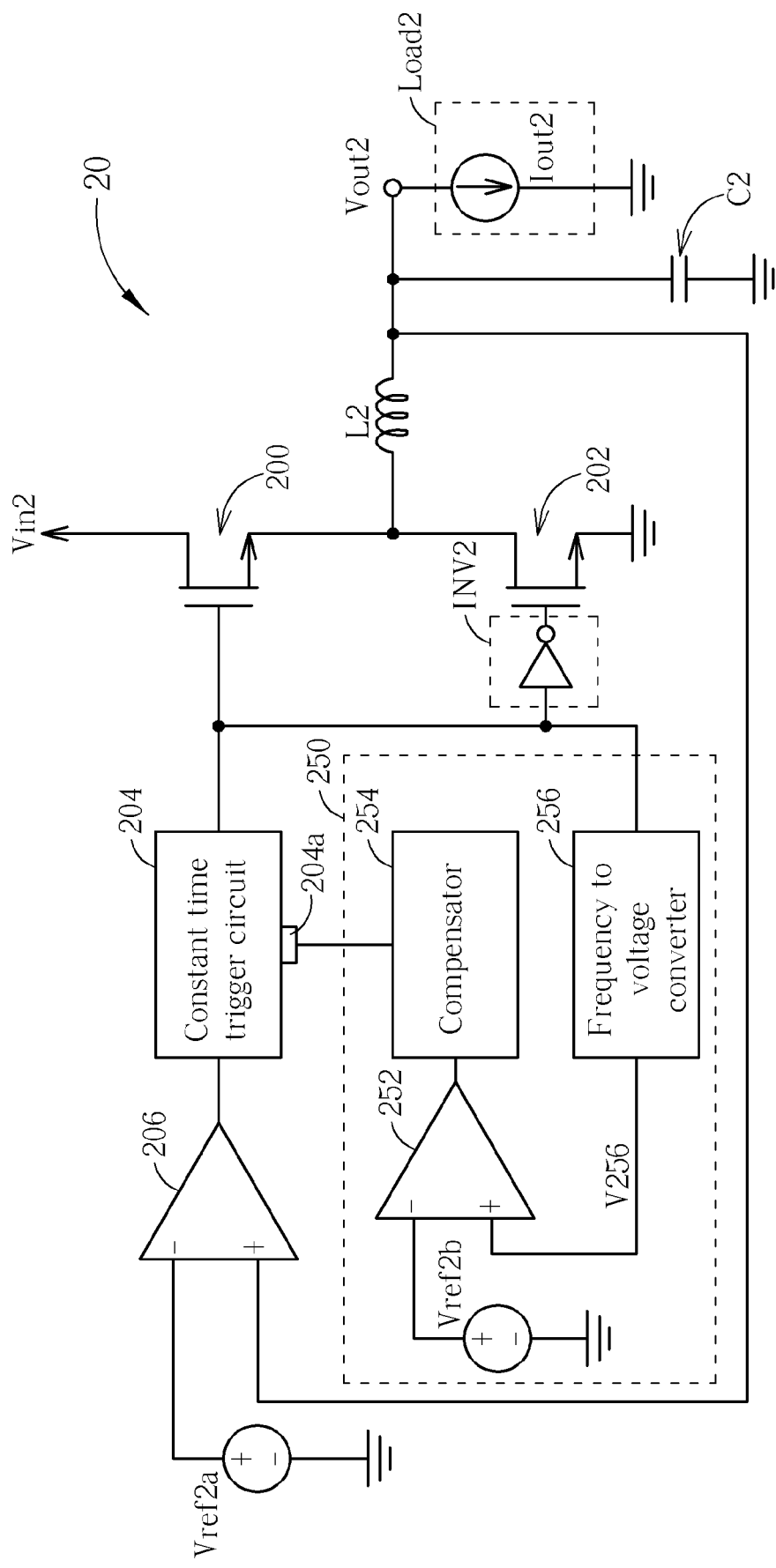
FIG. 2 illustrates a schematic diagram of a DC-DC switching regulator of the prior art which can fix an operating frequency.
Figure 3:
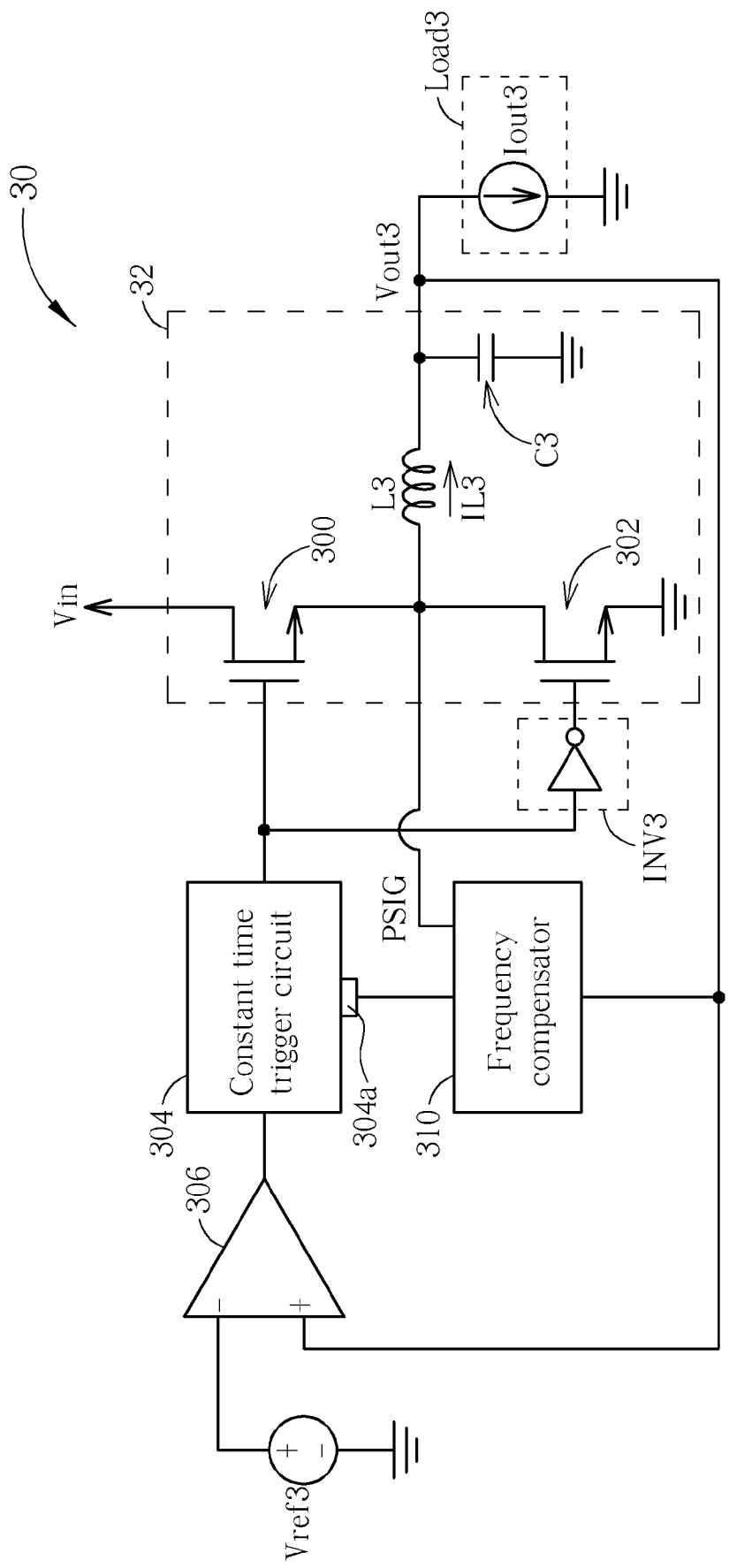
FIG. 3 illustrates a schematic diagram of a DC-DC switching regulator according to an embodiment of the present invention.

Please refer to FIG. 3, which illustrates a schematic diagram of a DC-DC switching regulator 30 according to an embodiment of the present invention. The DC-DC switching regulator 30 is mainly utilized to provide an output voltage Vout3 to a load Load3, which is denoted as a current source Iout3. The DC-DC switching regulator 30 comprises a power stage circuit 32, a comparator 306, a reference voltage Vref3, an inverter INV3, a constant time trigger circuit 304 and a frequency compensator 310. The power stage circuit 32 comprises an upper gate switch 300, a lower gate switch 302, an inductor L3, and a capacitor C3. The architecture of the DC-DC switching regulator 30 is similar to that of the DC-DC switching regulator 20, while the frequency compensator 310 of the DC-DC switching regulator 30 controls the constant time trigger circuit 304 according to an inductor current IL3 of the inductor L3 and an output voltage Vout3, to fix an operating frequency. The control input end 304a can be utilized to adjust the turn-on time of the constant time trigger circuit 304 for the purpose of frequency fixing. The working principle of the frequency compensator 310 is introduced as follows.

In the DC-DC switching regulator 30, the output voltage Vout3 can be derived by examining the voltage across the inductor L3 and can be expressed by the following equation:

$$Vout3 = \frac{1}{Ts} \cdot \int_0^{Ton} (Vin3 - IL3 \cdot Rds1) \cdot dt + \frac{1}{Ts} \cdot \int_{Ton}^{Ts} (0 - IL3 \cdot Rds2) \cdot dt.$$

The symbols Ts, Ton, IL3, Rds1 and Rds2 denote the length of the operation period, the length of the turn-on time of the upper gate switch 300, the inductor current, the on resistance of the upper gate switch 300 and the on resistance of the lower gate switch 302, respectively. The first term on the right hand side of the above equation is contributed by the condition when the upper gate switch 300 is on and the lower gate switch 302 is off; meanwhile, the second term on the right hand side is contributed by the condition when the upper gate switch 300 is off and the lower gate switch 302 is on. These two terms determine the magnitude of the output voltage Vout3. And, when the input voltage Vin3, the output voltage Vout3 and the inductor current IL3 are relatively stable, the above equation can be rearranged as the following equation:

$$Ts \cdot Vout3 = Ton \cdot (Vin3 - IL3 \cdot Rds1) + [0 - (Ts - Ton) \cdot (IL3 \cdot Rds2)].$$

By rearranging the above equation, the operation period Ts can be expressed as:

$$Ts = Ton \cdot \frac{Vin3 + IL3 \cdot (Rds2 - Rds1)}{Vout3 + (IL3 \cdot Rds2)}$$

$$= Ton \cdot \frac{Vin3}{Vout3} \cdot \frac{1 + \frac{IL3 \cdot (Rds2 - Rds1)}{Vin3}}{1 + \frac{(IL3 \cdot Rds2)}{Vout3}}$$

According to function of the constant time trigger circuit 304, the length of the turn-on time Ton is determined internally by the output voltage Vout3 and the input voltage Vin3, and the Ton can then be expressed as:

$$Ton = K1 \cdot \frac{Vout3}{Vin3},$$

where the parameter K1 is a constant parameter and is decided by the internal circuit of the constant time trigger circuit 304. Then, the equation for Ts can now be rearranged and expressed as the following equation:

$$Ts = K1 \cdot \frac{1 + \frac{IL3 \cdot (Rds2 - Rds1)}{Vin3}}{1 + \frac{(IL3 \cdot Rds2)}{Vout3}}.$$

Typically, the parameter K1 is equal to 2.5 µsec for a switching regulator operated at 400 KHz.

By closely examining the above equation, the operating frequency of the DC-DC switching regulator 30 will be changed if the values or the magnitudes of the inductor current IL3, the output voltage Vout3, the input voltage Vin3, the on resistance of the upper gate switch Rds1 and/or the on resistance of the lower gate switch Rds2 change, and the stability of the operating frequency of the DC-DC switching regulator will be affected. According to more detailed numerical simulation, the term in the denominator, which is $$1 + \frac{(IL3 \cdot Rds2)}{Vout3},$$

of the above equation is the one which is much influential to the stability of the operating frequency. According to the above equation for Ts, if the influence of the term in the denominator can be removed, the operating frequency of the DC-DC switching regulator will be much more stable.

Therefore, in the present invention, in order to stabilize the operating frequency of the DC-DC switching regulator 30, the equation to determine the turn-on time can be modified and expressed as follows:

$$Ton = K1 \cdot \frac{Vout3 + IL3 \cdot Rds2}{Vin3}.$$

In the equation above, the term Vout3+IL3·Rds2 in the nominator is used to replace the original nominator (Vout3) in the equation for determining the turn-on time Ton. This is equivalent to increase the output voltage Vout3 by $$1 + \frac{(IL3 \cdot Rds2)}{Vout3}$$

times, such that the Ton Time can also be increased by $$1 + \frac{(IL3 \cdot Rds2)}{Vout3}$$

times, then the above equation for the period of operation Ts can be modified as follows:

$$Ts = K1 \cdot \left[ 1 + \frac{IL3 \cdot (Rds2 - Rds1)}{Vin3} \right].$$

As can be observed in the above equation, the term in the denominator, $$1 + \frac{(IL3 \cdot Rds2)}{Vout3},$$

has been removed, and the operating frequency of the DC-DC switching regulator 30 becomes much more stable. To implement the working principles stated above, the frequency compensator 310 of the present invention is designed to generate the special voltage Vout3+IL3·Rds2, and the constant time trigger circuit 304 will determine the pulse width of the turn-on time according to the latest equation for Ton. Noticeably, a phase signal PSIG is measured at one end of the inductor L3 and is equal to the voltage IL3·Rds2, which is also the voltage difference across the lower gate switch 302 when the device is on.

Figure 4:
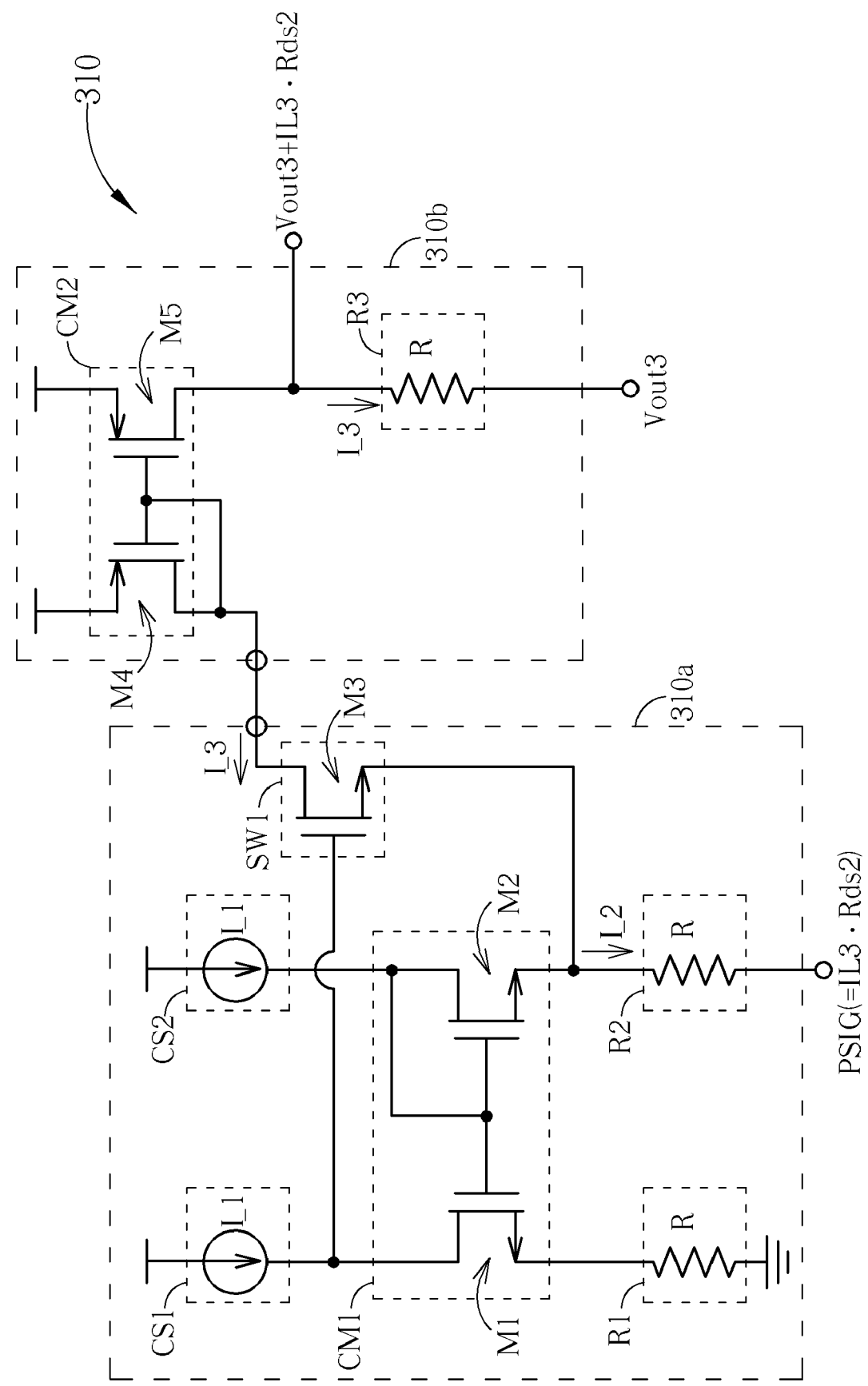
FIG. 4 illustrates a schematic diagram of a circuit of a frequency compensator used in a DC-DC switching regulator according to an embodiment of the present invention.

Please refer to FIG. 4, which illustrates a schematic diagram of a circuit of the frequency compensator 310 used in the DC-DC switching regulator 30 according to an embodiment of the present invention. The circuit of the frequency compensator 310 illustrated in FIG. 4 can be utilized to generate the voltage Vout3+IL3·Rds2, and comprises a voltage-to-current converter 310a and a current-to-voltage converter 310b. The voltage-to-current converter 310a is utilized to convert the voltage level of the phase signal PSIG, which is equal to IL3·Rds2, into a converted current I_3. Then, the current-to-voltage converter 310b transforms the converted current I_3 into a voltage (by a resistor) and generates the sum of the voltage IL3·Rds2 and the output voltage Vout3.

To detail further, the voltage-to-current converter 310a comprises two resistors R1, R2, a current mirror CM1, two current sources CS1, CS2, and a current switch SW1. The current mirror CM1 comprises two transistors M1, M2 of the same type. Both of the current sources CS1, CS2 can supply the same magnitude of current I_1 into the transistors M1, M2, respectively. The current mirror CM1 further assures the currents flowing through the transistor M1 and the transistor M2 are of the same magnitude. Therefore, if the output current is I_3, then the voltage-to-current converter 310a can assure that a current I_2 flowing through the resistor R2 is equal to the current I_1 plus the output current I_3. If the phase signal PSIG, which is IL3·Rds2, is applied to the input end of the voltage-to-current converter 310a, the output current I_3 will be proportional to the phase signal IL3·Rds2, and can be expressed as follows:

$$I\_3 = \frac{IL3 \cdot Rds2}{R},$$

where R is the resistance of the resistor R2.

Furthermore, the output current I_3 of the voltage-to-current converter 310a can be fed into the current-to-voltage converter 310b. The current-to-voltage converter 310b comprises a current mirror CM2 and a resistor R3. The current mirror CM2 comprises two transistors M4 and M5 of the same type. The current mirror CM2 will duplicate the input current I_3 and make the current flowing through the resistor R3 to be equal to I_3. The current I_3 can be converted into a voltage difference by flowing through the resistor R3. Since the voltage of the input end of the current-to-voltage converter 310b is Vout3, the voltage in the output end of the current-to-voltage converter 310b can be derived as follows:

$$Vout3 + I\_3 \cdot R = Vout3 + \frac{IL3 \cdot Rds2}{R} \cdot R = Vout3 + IL3 \cdot Rds2.$$

As can be observed, the output voltage of the current-to-voltage converter 310b as well as the frequency compensator 310 is equal to Vout3+IL3·Rds2. Therefore, by taking the output voltage Vout3 and the phase signal IL3·Rds2 as the inputs of the frequency compensator 310, the voltage Vout3+IL3·Rds2 can be generated by the circuit illustrated in FIG. 4.

Noticeably, some other voltages which are proportional to Vout3+IL3·Rds2 can also be used to adjust the length of the turn-on time Ton, and the $$1 + \frac{(IL3 \cdot Rds2)}{Vout3}$$

term in the denominator can also be removed. People with ordinary knowledge in the art should readily to know there are numerous alterations can be made. For example, a voltage, which is equal to $$\frac{1}{3} \cdot (Vout3 + IL3 \cdot Rds2),$$

can also be applied to remove the denominator, $$1 + \frac{(IL3 \cdot Rds2)}{Vout3}.$$

To realize this, the circuit in the frequency compensator 310 can be modified by changing the resistance of R3 from R to R/3, and the input voltage from Vout3 to $$\frac{Vout3}{3}.$$

Under this condition, a common voltage divider can be added to generate the voltage $$\frac{Vout3}{3}$$

from Vout3. By this method, the voltage $$\frac{1}{3} \cdot (Vout3 + IL3 \cdot Rds2)$$

can be generated to adjust the turn-on time Ton. In this case, the period of operation becomes:

$$Ts = \frac{1}{3} \cdot K1 \cdot \left[1 + \frac{IL3 \cdot (Rds2 - Rds1)}{Vin3}\right].$$

It can be observed from the above equation that a constant parameter ⅓ has appeared in the equation, and the internal circuit of the constant time trigger circuit 304 which is related to the parameter K1, can be readily modified by the designer to select a proper operating frequency (or period). As stated above in this alternative embodiment of the present invention, the influence of the denominator term, $$1 + \frac{(IL3 \cdot Rds2)}{Vout3},$$

can also be removed.

To sum up, the frequency compensator 310 of the present invention is utilized to generate the special voltage Vout3+IL3·Rds2, and to increase the output voltage Vout3 by $$1 + \frac{(IL3 \cdot Rds2)}{Vout3}$$

times, such that when the load experiences a sudden change, the turn-on time Ton can be increased by $$1 + \frac{(IL3 \cdot Rds2)}{Vout3}$$

times, and the operating frequency can be kept nearly constant.

Furthermore, in many applications, where both the upper gate switch and the lower gate switch use the same type of power transistors, the on resistance of the lower gate switch Rds2 is very close to the on resistance of the upper gate switch Rds1, then the term $$\left[1 + \frac{IL3 \cdot (Rds2 - Rds1)}{Vin3}\right]$$

in the nominator of the above equation will be very close to 1, and the period of operation Ts will be very close to a constant value. However, even the upper gate switch 300 and the lower gate switch 302 are not of the same type, the operating frequency can be stabilized by increasing the output voltage Vout3 by $$1 + \frac{(IL3 \cdot Rds2)}{Vout3}$$

times, and thus, the present invention can be used to increase the turn-on time Ton by $$1 + \frac{(IL3 \cdot Rds2)}{Vout3}$$

times.

Also, noticeably, instead of utilizing the phase signal PSIG to get a voltage signal corresponding to the magnitude of the output current, some alternatives can also be utilized to get the magnitude of the output current (e.g. by using a proprietary sensing resistor in the output current path to sense the magnitude of the current). The present invention can utilize the frequency compensator 310 to replace the phase signal PSIG by any signal which is corresponding to the magnitude of the output current to perform the functions of fixing the operating frequency.

On the other hand, compared with the DC-DC switching regulator of the prior art, the architecture of the present invention becomes much simpler. The DC-DC switching regulator 20 of the prior art needs to sample the PWM signal generated by the constant time trigger circuit 204, and if the period of operation is longer than the desired value, the turn-on time Ton is adjusted to fix the operating frequency. To implement the architecture of the prior art, the circuit needs to realize an error integration process; therefore, it will include at least an OTA (operational transconductance amplifier), and a large on-chip capacitor. However, the present invention only needs a compact circuit to decide the summation of the output voltage Vout3 and the voltage across the lower gate switch 302. According to experimental results, the present invention spends only about 20% of the chip area of the circuit of the prior art. Also, according to the experiment, the operating frequency can be fixed in a narrow range (with variation less than 10%) for a wide range of load current (3~10 Amperes), with Rds1=9 mini-ohms, and Rds2=4 mini-ohms.

The present invention regulates the operating frequency of the DC-DC switching regulator in a nearly fixed manner, such that the design of the frequency sensitive components of the DC-DC switching regulator becomes much simpler and more effective to reduce the output ripples. The present invention develops a theoretical background for adjusting the turn-on time of the constant time trigger circuit by referring to the output voltage and the voltage across the lower gate switch (phase signal). Meanwhile, the present invention develops a compact circuit to calculate the summation of the output voltage and the phase signal, such that the turn-on time and the operating frequency can be adjusted effectively according to the theory being developed. The experiment done in the lab proves that the theory and the circuit of the present invention are function correct and cost effective.

Those skilled in the art will readily observe that numerous modifications and alterations of the device and method may be made while retaining the teachings of the invention.

What is claimed is:

1. A switching regulator for fixing a frequency, comprising:
a power stage circuit, for receiving an input voltage and outputting an output voltage according to an control signal, comprising:
an upper gate switch;
a lower gate switch coupled to the upper gate switch; and
an output inductor coupled to the upper gate switch and the lower gate switch;
a reference voltage generator for generating a reference voltage;
a comparator for outputting a comparing result according to the output voltage and the reference voltage;
a constant-time trigger circuit for outputting the control signal according to the comparing result and a compensating signal; and
a frequency compensator for outputting the compensating signal according to the output voltage and a phase signal;
wherein the phase signal is corresponding to the magnitude of the voltage across the lower gate switch of the power stage circuit.

2. The switching regulator of claim 1 further comprising an output capacitor coupled to the output inductor with the output voltage across the output capacitor.

3. The switching regulator of claim 1 further comprising a load coupled to the power stage circuit.

4. The switching regulator of claim 1, wherein the upper gate switch and the lower gate switch are metal-oxide semiconductor transistors (MOSFETs).

5. The switching regulator of claim 1, wherein the frequency compensator comprises:
a voltage-to-current converter for outputting a converted current according to the phase signal; and
a current-to-voltage converter for outputting a compensating signal according to the converted current and the output voltage.

6. The switching regulator of claim 5 wherein the voltage-to-current converter comprises:
a first resistor, comprising a first end, and a second end coupled to a ground end;
a second resistor, comprising a first end, and a second end coupled to the phase signal;
a current mirror, comprising a first end, a second end coupled to the first end of the first resistor, a third end, and a fourth end coupled to the first end of the second resistor;
a first current source, comprising a first end coupled to a voltage source, and a second end coupled to the first end of the current mirror;
a second current source, comprising a first end coupled to the voltage source, and a second end coupled to the third end of the current mirror; and
a current switch, comprising a first end for outputting the converted current, a second end coupled to the first end of the current mirror, and a third end coupled to the fourth end of the current mirror.

7. The switching regulator of claim 6, wherein the current mirror comprises:
a first transistor, comprising a first end coupled to the first end of the current mirror, a second end, and a third end, coupled to the second end of the current mirror; and
a second transistor, comprising a first end coupled to the third end of the current mirror, a second end coupled to the second end of the first transistor and the first end of the second transistor, and the third end coupled to the fourth end of the current mirror.

8. The switching regulator of claim 7, wherein the first transistor is an n-type MOSFET, and the first end is a drain, the second end is a gate, and the third end is a source.

9. The switching regulator of claim 7, wherein the second transistors is an n-type MOSFET, and the first end is a drain, the second end is a gate, and the third end is a source.

10. The switching regulator of claim 6, wherein the current switch is an n-type MOSFET, and the first end is a drain, the second end is a gate, and the third end is a source.

11. The switching regulator of claim 5, wherein the current-to-voltage converter comprises:
a current mirror comprising a first end coupled to a voltage source, a second end coupled to the voltage source, a third end for receiving the converted current, and a fourth end for outputting the compensating signal; and
a resistor comprising a first end coupled to the fourth end of the current mirror, and a second end for receiving the output voltage.

12. The switching regulator of claim 11, wherein the current mirror comprises:
a first transistor, comprising a first end coupled to the first end of the current mirror, a second end, and a third end, coupled to the second end of the current mirror and the second end of the first transistor; and
a second transistor, comprising a first end coupled to the third end of the current mirror, a second end coupled to the second end of the first transistor, and the third end coupled to the fourth end of the current mirror.

13. The switching regulator of claim 12, wherein the first transistor is a p-type MOSFET, the first end is a source, the second end is a gate, and the third end is a drain.

14. The switching regulator of claim 12, wherein the second transistor is a p-type MOSFET, the first end is a source, the second end is a gate, and the third end is a drain.

15. The switching regulator of claim 1 further comprising an inverter coupled to the constant-time trigger circuit and a control end of the lower gate switch for processing an inverse operation on a signal outputted from the constant-time trigger circuit.

16. The switching regulator of claim 1, wherein the constant-time trigger is an on-time trigger.

17. The switching regulator of claim 1, wherein the constant-time trigger is an off-time trigger.

18. A frequency compensator for a switching regulator comprising:
a voltage-to-current converter for outputting a converted current according to the phase signal; and
a current-to-voltage converter for outputting a compensating signal according to the converted current and the output voltage;
wherein the voltage-to-current converter comprises:
a first resistor, comprising a first end, and a second end coupled to a ground end;
a second resistor, comprising a first end, and a second end coupled to the phase signal;
a current mirror, comprising a first end, a second end coupled to the first end of the first resistor, a third end, and a fourth end coupled to the first end of the second resistor;
a first current source, comprising a first end coupled to a voltage source, and a second end coupled to the first end of the current mirror;
a second current source, comprising a first end coupled to the voltage source, and a second end coupled to the third end of the current mirror; and
a current switch, comprising a first end for outputting the converted current, a second end coupled to the first end of the current mirror, and a third end coupled to the fourth end of the current mirror.

19. The frequency compensator of claim 18, wherein the current mirror comprises:
a first transistor, comprising a first end coupled to the first end of the current mirror, a second end, and a third end, coupled to the second end of the current mirror; and
a second transistor, comprising a first end coupled to the third end of the current mirror, a second end coupled to the second end of the first transistor and the first end of the second transistor, and the third end coupled to the fourth end of the current mirror.

20. The frequency compensator of claim 19, wherein the first transistor is an n-type MOSFET, the first end is a drain, the second end is a gate, and the third end is a source.

21. The frequency compensator of claim 19, wherein the second transistors is an n-type MOSFET, the first end is a drain, the second end is a gate, and the third end is a source.

22. The frequency compensator of claim 18, wherein the current switch is an n-type MOSFET, the first end is a drain, the second end is a gate, and the third end is a source.

23. The frequency compensator of claim 18, wherein the current-to-voltage converter comprises:
a current mirror comprising a first end coupled to a voltage source, a second end coupled to the voltage source, a third end for receiving the converted current, and a fourth end for outputting the compensating signal; and
a resistor comprising a first end coupled to the fourth end of the current mirror, and a second end for receiving the output voltage.

24. The frequency compensator of claim 23, wherein the current mirror comprises:
a first transistor, comprising a first end coupled to the first end of the current mirror, a second end, and a third end, coupled to the second end of the current mirror and the second end of the first transistor; and
a second transistor, comprising a first end coupled to the third end of the current mirror, a second end coupled to the second end of the first transistor, and the third end coupled to the fourth end of the current mirror.

25. The frequency compensator of claim 24, wherein the first transistor is a p-type MOSFET, and the first end is a source, the second end is a gate, and the third end is a drain.

26. The frequency compensator of claim 24, wherein the second transistor is a p-type MOSFET, and the first end is a source, the second end is a gate, and the third end is a drain.

27. A frequency compensator for a switching regulator comprising:
a voltage-to-current converter for outputting a converted current according to the phase signal; and
a current-to-voltage converter for outputting a compensating signal according to the converted current and the output voltage;
wherein the current-to-voltage converter comprises:
a current mirror comprising a first end coupled to a voltage source, a second end coupled to the voltage source, a third end for receiving the converted current, and a fourth end for outputting the compensating signal; and
a resistor comprising a first end coupled to the fourth end of the current mirror, and a second end for receiving the output voltage.

28. The frequency compensator of claim 27, wherein the voltage-to-current converter comprises:
a first resistor, comprising a first end, and a second end coupled to a ground end;
a second resistor, comprising a first end, and a second end coupled to the phase signal;
a current mirror, comprising a first end, a second end coupled to the first end of the first resistor, a third end, and a fourth end coupled to the first end of the second resistor;
a first current source, comprising a first end coupled to a voltage source, and a second end coupled to the first end of the current mirror;
a second current source, comprising a first end coupled to the voltage source, and a second end coupled to the third end of the current mirror; and
a current switch, comprising a first end for outputting the converted current, a second end coupled to the first end of the current mirror, and a third end coupled to the fourth end of the current mirror.

29. The frequency compensator of claim 28, wherein the current mirror comprises:
a first transistor, comprising a first end coupled to the first end of the current mirror, a second end, and a third end, coupled to the second end of the current mirror; and
a second transistor, comprising a first end coupled to the third end of the current mirror, a second end coupled to the second end of the first transistor and the first end of the second transistor, and the third end coupled to the fourth end of the current mirror.

30. The frequency compensator of claim 29, wherein the first transistor is an n-type MOSFET, the first end is a drain, the second end is a gate, and the third end is a source.

31. The frequency compensator of claim 29, wherein the second transistors is an n-type MOSFET, the first end is a drain, the second end is a gate, and the third end is a source.

32. The frequency compensator of claim 28, wherein the current switch is an n-type MOSFET, the first end is a drain, the second end is a gate, and the third end is a source.

33. The frequency compensator of claim 27, wherein the current mirror comprises:
a first transistor, comprising a first end coupled to the first end of the current mirror, a second end, and a third end, coupled to the second end of the current mirror and the second end of the first transistor; and
a second transistor, comprising a first end coupled to the third end of the current mirror, a second end coupled to the second end of the first transistor, and the third end coupled to the fourth end of the current mirror.

34. The frequency compensator of claim 33, wherein the first transistor is a p-type MOSFET, and the first end is a source, the second end is a gate, and the third end is a drain.

35. The frequency compensator of claim 33, wherein the second transistor is a p-type MOSFET, and the first end is a source, the second end is a gate, and the third end is a drain.

* * * * *